United States Patent [19]
Leighley

[11] 4,039,841
[45] Aug. 2, 1977

[54] X-RAY GRID ADAPTOR

[75] Inventor: Kenneth C. Leighley, East Setauket, N.Y.

[73] Assignee: Spectronics Corporation, Westbury, N.Y.

[21] Appl. No.: 657,323

[22] Filed: Feb. 11, 1976

[51] Int. Cl.² .......................................... H01J 35/16
[52] U.S. Cl. .................................... 250/508; 250/482
[58] Field of Search ............... 250/482, 452, 508, 509

[56] References Cited
U.S. PATENT DOCUMENTS

| | | | |
|---|---|---|---|
| 2,336,026 | 12/1943 | Millenaar | 250/508 |
| 2,605,427 | 7/1952 | Delhumeau | 250/508 |
| 2,767,323 | 10/1956 | Stava et al. | 250/509 |
| 3,784,835 | 1/1974 | Schmidt | 250/482 |
| 3,928,770 | 12/1975 | Turner | 250/482 |

Primary Examiner—Alfred E. Smith
Assistant Examiner—P. C. Anderson
Attorney, Agent, or Firm—Seidel, Gonda & Goldhammer

[57] ABSTRACT

There is disclosed an X-ray grid adaptor which is adjustable to receive a variety of X-ray cassettes of different thicknesses to thereby form a grid cassette. After the X-ray procedure, the cassette is removed from the X-ray grid adaptor whereby the X-ray grid adaptor may be used with another cassette.

9 Claims, 5 Drawing Figures

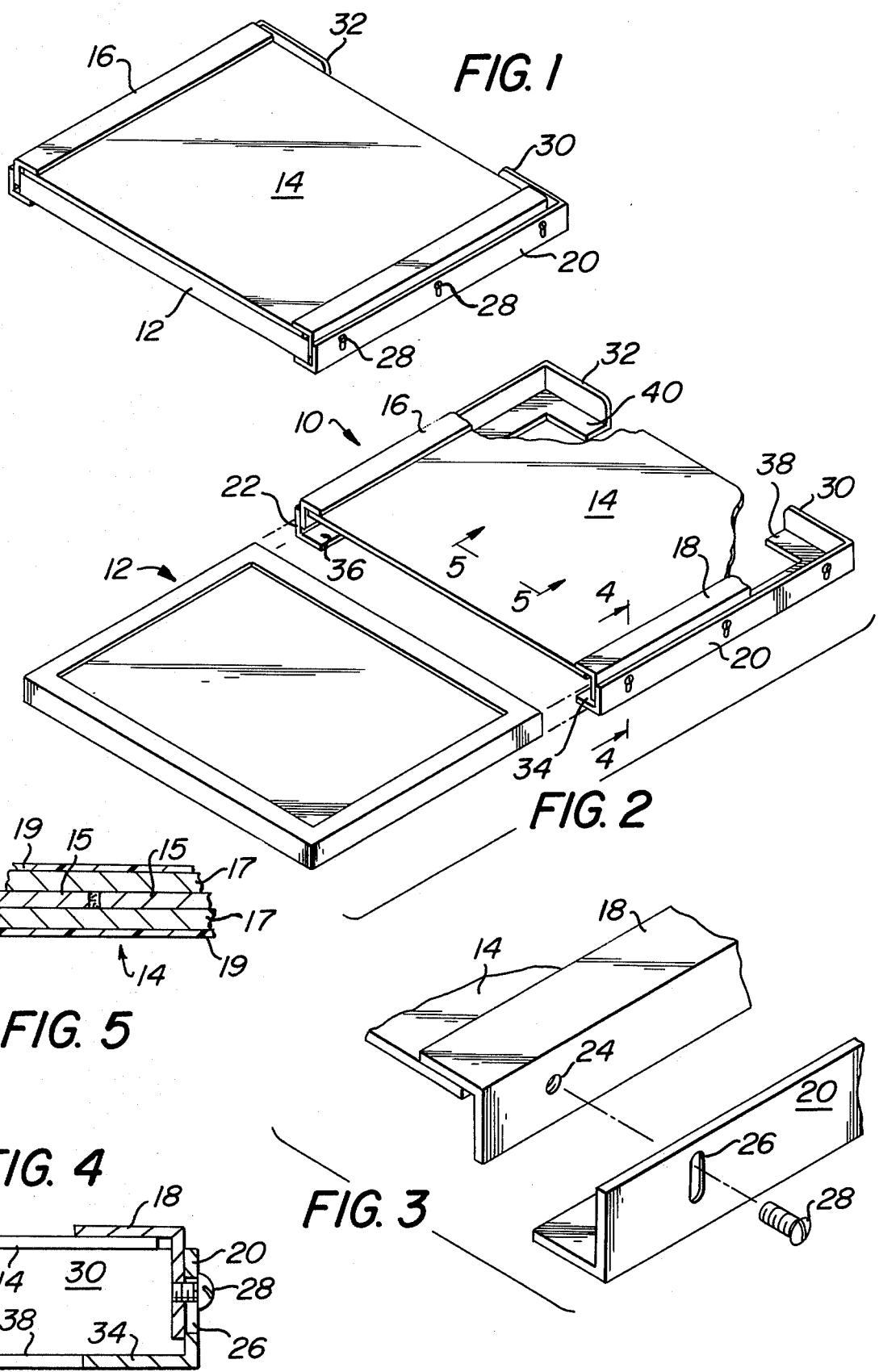

X-RAY GRID ADAPTOR

BACKGROUND

Heretofore, there have been used cassettes having an attached X-ray grid which are expensive, and single purpose. Newer designs of cassettes have been proposed and constructed in a manner so that grids cannot be built into the cassette. The devices used heretofore lack versatility. The present invention substantially reduces the cost of X-rays while providing versatility whereby newer designs of cassettes may be used as a grid cassette.

The present invention is directed to an X-ray grid adaptor which includes a grid having top rails on opposite sides thereof. A discrete bottom rail is connected to each top rail. Each bottom rail has a flange extending generally parallel to and spaced from the grid. The flanges extend toward each other and cooperate with the grid to define a cassette channel beginning along one edge of the grid.

A means is provided to facilitate adjustment of the distance between said flanges and said grid whereby cassettes of different thicknesses may be accommodated. A means is provided to define a limit stop along a portion of an edge of the grid remote from the inlet to the channel. The limit stop is generally perpendicular to the grid. Hence, a cassette may be introduced into the channel and thereby form a grid cassette.

The present invention is directed to an X-ray grid adaptor which materially reduces the costs involved in obtaining a grid cassette by separating the grid and cassettes into discrete components whereby the X-ray grid adaptor may be used with any one of a plurality of cassettes of different thickness.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a perspective view of a cassette supported within the X-ray grid adaptor of the present invention thereby forming a grid cassette.

FIG. 2 is an exploded view of the cassette and X-ray grid adaptor of the present invention.

FIG. 3 is a partial exploded view of one portion of the mating rails of the X-ray grid adaptor of the present invention.

FIG. 4 is a sectional view taken along the line 4—4 in FIG. 2.

FIG. 5 is a sectional view taken along the line 5—5 in FIG. 2 but on an enlarged scale.

Referring to the drawing in detail, wherein like numerals indicate like elements, there is shown in FIG. 1 a grid cassette comprised of the X-ray grid adaptor 10 of the present invention and a cassette supported thereby.

The diagnostic quality of a radiograph is determined by the degree of clarity with which details in the anatomical structure can be distinguished through density differences in the developed film. While these differences in density may be slight, the line of demarcation should be sharp. Anything which makes these differences more apparent improves the diagnostic qualities of the radiograph. X-ray filter grids improve the diagnostic quality of radiographs by trapping the greater part of secondary radiation thereby providing cleaner, clearer and more detailed radiographic images.

The X-ray grid adaptor 10 includes a grid 14 which per se is known to those skilled in the art and formally was part of the cassette. X-ray grids per se are commercially available and are either of the focused or parallel lead strip type produced in various configurations. The grid 14 is preferably constructed with spaced lead strips 15 bonded together and sealed within an aluminum envelope 17 with any one of various spacer materials such as aluminum or paper between adjacent strips. A decorative covering material 19 transparent to X-rays, such as a layer of polymeric plastic or paint is applied to both faces of the grid 14 whereby it will be strong, durable and impervious to moisture. The length and width of the grid 14 may be varied as desired. Suitable lengths and widths of the grid 14 are 9 inches by 11 inches or 11 inches by 13 inches. Any one of a wide variety of grid ratios may be used.

The grid 14 is integral with or connected to separate top rails 16 and 18 disposed along opposite side edges of the grid 14. Where the top rails 16 and 18 are discrete with respect to the grid 14, they are rigidly secured thereto in any convenient manner such as by riveting. A pair of bottom rails 20 and 22 are provided. The rails 16, 18, 20, 22 are preferably made from aluminum so as to be lightweight, non-corrosive and transparent to X-rays. The bottom rail 20 is adjustably coupled to the top rail 18. The bottom rail 22 is adjustably coupled to the top rail 16.

As shown more clearly in FIGS. 3 and 4, a portion of the top rail 18 which is generally perpendicular to the grid 14 is provided with one or more threaded holes 24. The bottom rail 20 is provided with a elongated slot 26 generally opposite the hole 24. A threaded fastener 28 extends through slot 26 and is threaded in hole 24. The elongated nature of slot 26 facilitates adjusting the thickness of the channel defined by grid 14 and the flange 34 on the bottom rail 20. The bottom rail 22 is similarly coupled to the top rail 16 and has a similar flange 36. The flanges 34 and 36 extend toward one another and embrace side edge portions of the cassette 12 as shown more clearly in FIG. 1.

The channel on the X-ray grid adaptor 10 for receiving the cassette 12 is open along one side of the X-ray grid adaptor 10 as shown more clearly in FIG. 2. The opposite side of the channel is closed by a limit stop. The limit stop is defined by elements 30 and 32. Element 30 is integral with the rail 20. Element 32 is integral with the rail 22. Element 30 has an inwardly directed flange 38 which is coextensive with flange 34. Element 32 has a similar flange 40 coextensive with flange 36.

An X-ray lab would have a large number of cassettes 12 but only a few of the X-ray grid adaptors 10. One cassette 12 is introduced into an X-ray grid adaptor 10 to thereby form a grid cassette which is used in a conventional manner. As soon as the film in the cassette 12 is exposed, the cassette 12 may be removed from the X-ray grid adaptor 10 and then processed in a conventional manner. Immediately thereafter, a new and different cassette 12 may be introduced into the channel of the X-ray grid adaptor 10 and the process repeated.

As a result of the present invention, a fewer number of grids and grid cassettes are in actual use. The cassettes which are constructed in a manner whereby they cannot have an integral grid are still capable of being used. Cassettes of different manufacturers are slightly different in thickness. When it is necessary to accommodate a different thickness cassette, it is only necessary to loosen the fasteners 28, adjust the thickness of a channel by moving the bottom rails 20 and 22 up or down, and then retightening the fasteners 28. The elements 30 and 32 stop an end face of the cassette at a proper location so as to position the cassette 12 under the grid 14.

The present invention may be embodied in other specific forms without departing from the spirit or essential attributes thereof and, accordingly, reference should be made to the appended claims, rather than to the foregoing specification as indicating the scope of the invention.

What is claimed is:

1. An X-ry grid adaptor comprising an X-ray grid, top rails fixedly connected to opposite side edges of said grid, discrete bottom rails, means for connecting a discrete bottom rail to each top rail, each bottom rail having a flange generally parallel to and spaced from said grid, said flanges and said grid defining a cassette channel entry at a third edge of said grid, said flanges extending toward each other, means for adjusting the distance between the plane of said flanges and the plane of a major face of said grid, and means defining a limit stop along at least a portion of a fourth edge of said grid and generally perpendicular thereto whereby an X-ray film cassette may be introduced into the channel to thereby form a grid cassette and then removed from the adaptor for processing the film.

2. An X-ray grid adaptor in accordance with claim 1 wherein said X-ray grid includes spaced strips of lead bonded together and sealed within an aluminum envelope which is transparent to X-rays and connected to said top rails.

3. An X-ray grid adaptor in accordance with claim 2 including a decorative covering impervious to moisture on the major faces of said grid.

4. An X-ray grid adaptor in accordance with claim 1 wherein said limit stop is a projection on at least one of said bottom rails.

5. An X-ray grid adaptor in accordance with claim 4 wherein said projection has a flange at the same elevation of the first mentioned flange and extending in a direction from said fourth edge toward said third edge and generally parallel to said grid.

6. An X-ray grid adaptor in accordance with claim 5 wherein each bottom rail has a projection forming a part of said limit stop means.

7. An X-ray grid adaptor in accordance with claim 1 wherein said adjusting means includes a threaded fastener extending through a slot in each of the bottom rails and connecting with said top rails, said slots being elongated in a direction perpendicular to said grid.

8. An X-ray grid adaptor in accordance with claim 7 wherein each of said top rails have first and second angled flanges, said first angled flanges being fixedly connected to said grid and said second angled flanges having means for connecting with said threaded fasteners.

9. An X-ray grid adaptor comprising an X-ray grid having a decorative covering impervious to moisture on the major faces of said grid, top rails fixedly connected to opposite side edges of said grid, discrete bottom rails, means for connecting a discrete bottom rail to each top rail, each bottom rail having a flange generally parallel to and spaced from said grid, said flanges and said grid defining a cassette entry at a third edge of said grid, said flanges extending toward each other, means for adjusting the distance between the plane of said flanges and the plane of a major face of said grid, said adjusting means including a threaded fastener extending through a slot in each of the bottom rails and connecting with said top rails, said slots being elongated in a direction perpendicular to said grid, each of said top rails having first and second angled flanges, said first angled flanges being fixedly connected to said grid and said second angled flanges having means for connecting with said threaded fasteners, a projection on at least one of said bottom rails, said projection having a flange at the same elevation of the first mentioned flange and extending in a direction from a fourth edge toward said third edge and generally parallel to said grid, said projection defining a limit stop along at least a portion of said fourth edge of said grid and generally perpendicular thereto whereby an X-ray film cassette may be introduced into the channel to thereby form a grid cassette and then removed from the adaptor for processing the film.

* * * * *